No. 690,384. Patented Dec. 31, 1901.
W. F. McNARY.
PLUMBER'S SHAVE HOOK.
(Application filed Mar. 29, 1901.)
(No Model.)

Witnesses.
Alfred A. Eicher
J. A. Riffey

Inventor.
William F. McNary
By Higdon & Longan, Attys

UNITED STATES PATENT OFFICE.

WILLIAM F. McNARY, OF ST. LOUIS, MISSOURI.

PLUMBER'S SHAVE-HOOK.

SPECIFICATION forming part of Letters Patent No. 690,384, dated December 31, 1901.

Application filed March 29, 1901. Serial No. 53,515. (No model.)

*To all whom it may concern:*

Be it known that I, WILLIAM F. MCNARY, of the city of St. Louis, State of Missouri, have invented certain new and useful Improvements in Plumbers' Shave-Hooks, of which the following is a full, clear, and exact description, reference being had to the accompanying drawings, forming a part hereof.

This invention relates to plumbers' shave-hooks; and it consists of the novel construction, combination, and arrangement of parts hereinafter shown, described, and claimed.

The object of this invention is to provide an improved shave-hook having a gage attachment, whereby it is rendered possible to operate the device over a space of uniform width.

Figure 1:
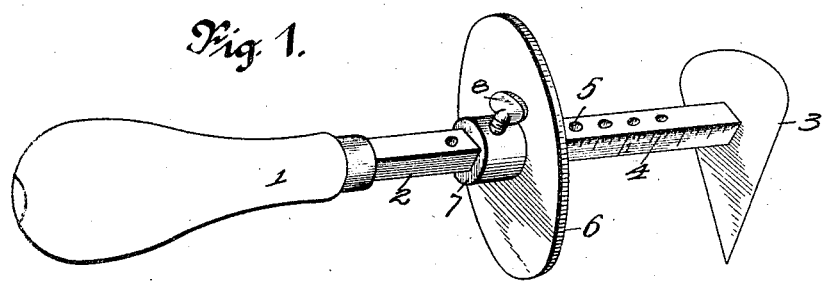
Figure 2:
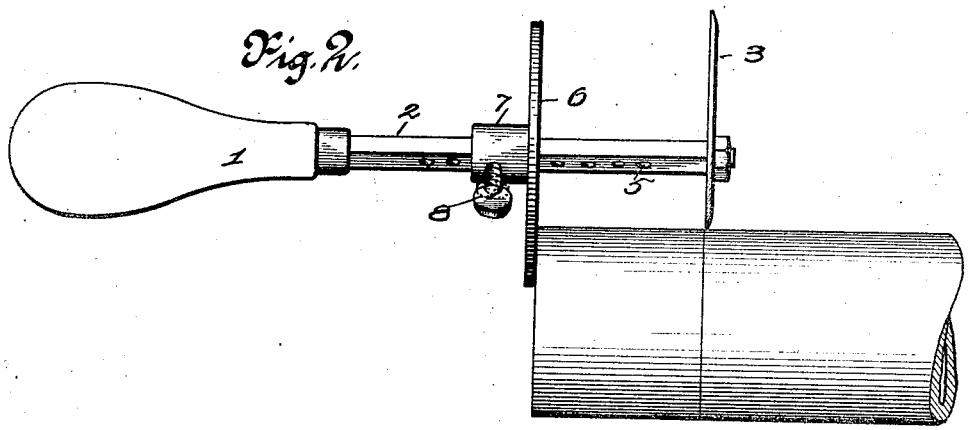
Figure 3:
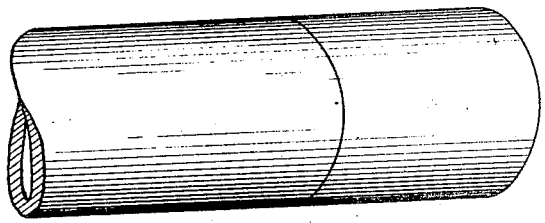

Figure 1 is a perspective view showing my complete invention. Fig. 2 is a view showing the device in position for use. Fig. 3 is a perspective view of a portion of a pipe which has been operated upon by my improved shave-hook.

In the construction of my invention I provide a handle 1, attached to a rod 2, on the opposite end of which is the scraper 3, which, as shown, is substantially triangular in form and which is provided with cutting edges entirely around its periphery. Upon one side of the rod 2 is a graduated scale 4, and the other side of said rod is provided with a series of openings 5, arranged at suitable distances from each other.

6 indicates a gage-disk mounted upon the rod 2 and provided on one side with a projecting hub or sleeve 7, having an opening in which is mounted a set-screw 8. The disk 6 may be operated upon the rod 2, and by referring to the scale 4 the operator can determine the exact width of the surface operated upon. When the disk 6 is placed in the desired position, the set-screw 8 is operated, its inner end engaging within the openings 5, and thereby holding it securely in position. The said openings 5 are of sufficient depth to permit the set-screw 8 to engage firmly therein, and thereby hold the disk 6 rigid on the rod 2, even though the set-screw become loose within the opening. The advantage of this arrangement may readily be seen, for were the set-screw engaged only against the face of the rod the disk would slide upon the rod whenever the set-screw became loose. This inconvenience is avoided by arranging the openings as described. The disk 6 is of such diameter that it projects farther away from the rod 2 than does the scraper 3, so that when the said scraper 3 is operated upon a pipe or other surface the said disk will bear against the end or side of the body which is operated upon. By this means the scraper 3 may be operated over a surface of uniform width and the gage can be made to operate over a greater or less surface, as desired.

I claim—

The combination in a shave-hook, of a square rod having a graduated scale formed on one side so that the space to be operated upon can be measured and a series of depressions formed at equal intervals on another side thereof, a scraper removably connected to one end of the rod, a gage-disk mounted to slide upon said rod, and extending equal distances from all sides thereof so that any side of the scraper can be used without changing the disk, and a projecting hub integral with the rear side of said disk and having an opening formed therein and a set-screw extending through the said opening and adapted to engage in the depressions formed in the rod and thereby hold the disk stationary upon the rod, substantially as specified.

In testimony whereof I affix my signature in presence of two witnesses.

WILLIAM F. McNARY.

Witnesses:
ALFRED A. EICKS,
JOHN C. HIGDON.